United States Patent
Garza et al.

(10) Patent No.: US 6,859,900 B2
(45) Date of Patent: Feb. 22, 2005

(54) INJECTION OF SELECTED NUMBERS OF ERRORS IN RETURNED LOOPBACK DATA TO PROVIDE GRAY-SCALE TYPE QANTIFICATION OF LOOP PERFORMANCE MEASUREMENTS

(75) Inventors: Martin Garza, Grapevine, TX (US); Joe Luna, Houston, TX (US); Mark Jefferies Ogden, Owens Cross Roads, AL (US); James Ernest Owen, Huntsville, AL (US); James Denson Wilson, Jr., Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 442 days.

(21) Appl. No.: 10/005,441

(22) Filed: Dec. 5, 2001

(65) Prior Publication Data
US 2003/0105998 A1 Jun. 5, 2003

(51) Int. Cl.[7] .............................................. G01R 31/28
(52) U.S. Cl. ........................................ 714/716; 714/712
(58) Field of Search .................................. 714/712, 713, 714/714, 716, 717, 746, 748, 749, 750, 715; 370/249, 335, 248, 242

(56) References Cited

U.S. PATENT DOCUMENTS 6,028,845 A * 2/2000 Serikawa et al. ........... 370/249

* cited by examiner

Primary Examiner—Albert Decady
Assistant Examiner—James C. Kerveros
(74) Attorney, Agent, or Firm—Allen, Dyer, Doppelt, Milbrath & Gilchrist, P.A.

(57) ABSTRACT

An in-band communication scheme reports the results of loop performance measurements from a remote site to a test site, by deliberately injecting, into a loopback sequence of a repeated code word, a selected one of different numbers of errors. The number of errors is selectable from among a plurality of different quantification values, based upon in which of a plurality of respective ranges of loop performance parameters, measured parameter values fall. The error data is thus effectively a gray-scale type of quantification of loop performance measurement data.

12 Claims, 5 Drawing Sheets

| IF MARGIN IS | AND PULSE ATTENUATION IS | THEN BIT ERRORS |
|---|---|---|
| 5 OR LESS | 31 OR HIGHER | 101 |
| 5 OR LESS | 26 - 30 | 102 |
| 5 OR LESS | 0 - 25 | 103 |
| 6 - 10 | 31 OR HIGHER | 104 |
| 6 - 10 | 26 - 30 | 105 |
| 6 - 10 | 0 - 25 | 106 |
| 11 OR HIGHER | 31 OR HIGHER | 107 |
| 11 OR HIGHER | 26 - 30 | 108 |
| 11 OR HIGHER | 0 - 25 | 109 |

INJECTION OF SELECTED NUMBERS OF ERRORS IN RETURNED LOOPBACK DATA TO PROVIDE GRAY-SCALE TYPE QANTIFICATION OF LOOP PERFORMANCE MEASUREMENTS

FIELD OF THE INVENTION

The present invention relates in general to telecommunication systems and subsystems therefor, and is particularly directed to a new and improved in-band communication scheme for reporting the results of loop performance measurements from a remote site, by deliberately injecting, into a loopback sequence of a repeated code word, a selected one of different numbers of errors that vary in accordance with respective ranges of loop performance parameters.

BACKGROUND OF THE INVENTION

In order to isolate potential problem conditions on their telecommunication links, such as but not limited to those used for transporting digital data (such as T1 and High data rate Digital Subscriber Line (HDSL) signals), service providers conventionally had to dispatch a technician to one or more equipment locations, such as a central office or remote site. At a respective site, the technician proceeds to interface a piece of test equipment, such as a personal digital assistant (PDA) or test set, with the link under test (LUT) or with an external communication port (e.g. an RS-232 port) of a transceiver unit to which the link is coupled.

Due to the considerable cost, manpower and time consumption associated with this dispatch approach, many of the various pieces of communication equipment that make up such networks now include auxiliary capability, such as but not limited to loopback, status monitoring, and provisioning, which are selectively engagable through the use of prescribed stimuli codes that are injected into an in-band embedded operations channel (EOC) data stream from a supervisory test site.

A non-limiting example of such a code (that is not a rotation of any other similar code) employed by equipment manufactured by the assignee of the present application for initiating (loop query) diagnostic operations in remote equipment is the 'DBDB'$_{HEX}$ sequence. In accordance with the use of this code, once a piece of equipment has been enabled for a particular diagnostic operation, such as a performance-monitoring loopback, it monitors the EOC for the presence of the code. Once the code (as transmitted in a repetitive sequence over a prescribed time interval (e.g., for several tens of seconds)) is detected, the interrogated piece of equipment will deliberately modify the received pattern being looped back to the initiating source, by the injection of errors at a prescribed rate or injection interval, to indicate whether or not measured performance (for example, in terms of signal quality and pulse attenuation) is satisfactory.

For example, if the defined parameters (e.g. signal quality (margin) and pulse attenuation) satisfy associated thresholds, the number of injected errors may be set at a first (relatively high) value, to indicate to the query source that the loop is operating satisfactorily, while the number of injected errors may be set at a second (relatively low) value, to indicate that loop performance is unsatisfactory. A shortcoming of this approach is the fact it does not indicate the 'wellness' of the loop; it only indicates whether the loop either passes or fails.

Because the thresholds against which performance is measured are customarily derived from some median set of criteria, a device returning a failure indication may actually be capable of providing a quite acceptable quality of performance for some period of time, before it becomes necessary to dispatch a technician for on-site testing and potential removal from service for upgrade or repair. Moreover, not all devices have the same level of maintenance/repair priority. It would be desirable, therefore, to have a more accurate picture of the performance capability of a remotely interrogated piece of equipment.

SUMMARY OF THE INVENTION

Pursuant to the invention, this objective is accomplished by a new and improved in-band communication scheme, in which the number of errors that can be deliberately injected or introduced into the returned loopback repetitive code stream is selectable from among a plurality of different quantification values, based upon in which of a plurality of respective ranges of loop performance parameters, the measured parameter values fall. By plurality is meant at least three quantification values, as opposed to only two values respectively associated with pass and fail conditions. What results from the use of a plurality of quantification values in accordance with the invention is akin to a gray-scale quantification of loop performance measurement data.

As will be described, for purpose of providing a non-limiting example, the plurality of quantification values may be associated with nine pairs of performance thresholds respectively corresponding to signal quality (or Margin) and Pulse Attenuation. Each of these pairs has a respectively different number of bit errors that are to be injected into the returned repetitive (DBDB) code stream. For example, the nine pairs may be formed from three threshold ranges for signal Margin: 1–5 dB or less (lowest quality); 2–6–10 dB (mid quality); and 3–11 dB or higher (highest quality), and three threshold ranges for Pulse Attenuation: 1–31 dB or higher (lowest quality); 2–26–30 dB (mid-quality); and 3–0–25 dB (highest quality).

When invoked, the loop performance measurement reporting mechanism initially determines looks for the prescribed code pattern ('DBDB$_{HEX}$') used to trigger bit error injection, and also whether a loopback has been established. Once these have occurred, worst case signal margin and pulse attenuation levels are measured. The performance quality measurement data is then processed in accordance with three comparison subroutines, beginning with lowest quality pulse attenuation, and proceeding through successively higher qualities. As a result of this subroutine processing, one of the multiple different values of bit errors is selected for injection into the looped back repetitive 'DBDB' sequence.

At the test initiation site, detecting and accumulating these inserted bit errors over a prescribed bit error accumulation interval will yield one of the bit error totals. From this accumulated value, the performance parameters of the loop are readily extracted from a look-up table, so as to provide the remote test site with the desired quantification of loop performance.

DETAILED DESCRIPTION

Figures 1, 2:
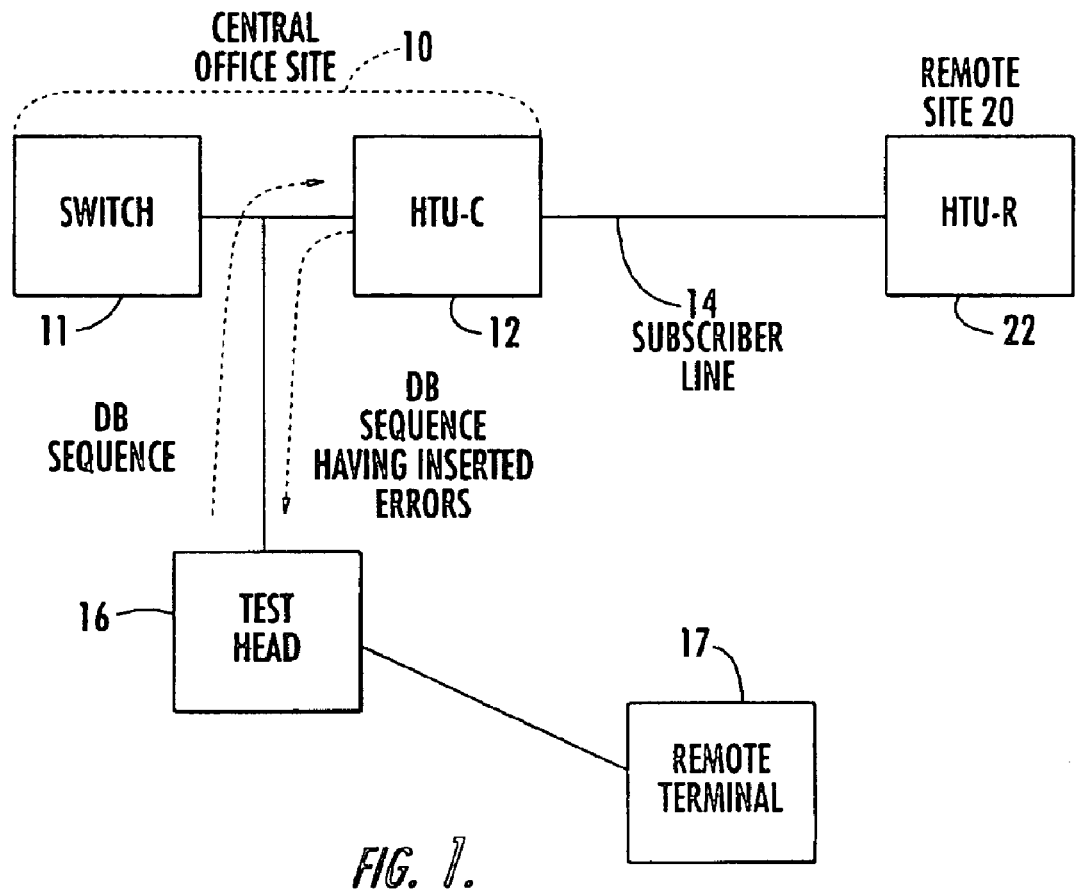
FIG. 1 diagrammatically illustrates a simplified example of a representative digital carrier telephone network, in which the remote loop performance reporting mechanism of the present invention may be employed.
FIG. 2 shows a Table listing nine pairs of performance thresholds respectively corresponding to signal quality (or Margin) and Pulse Attenuation, as well as the number of bit errors to be injected into the returned repetitive (DBDB) code stream in association with a respective threshold pair.

Before describing in detail the loop performance measurement reporting mechanism in accordance with the present invention, it should be observed that the invention resides primarily in what is effectively a prescribed augmentation of the communication control software employed by the micro-controllers within the digital signalling/interface units, such as the HTU-C and HTU-R equipments of a digital telecommunication network, so as to permit a remote test system controller to selectively establish a control link with and exchange query and response messages with such units. The details of the circuitry of the various pieces of telecommunication equipment are otherwise essentially unaffected.

Consequently, the configuration of such units and the manner in which they are interfaced with other communication equipment of a telephone network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

FIG. 1 diagrammatically illustrates a simplified example of a representative digital carrier telephone network, in which the remote loop performance reporting mechanism of the present invention may be employed. The network itself is shown as comprising a (relatively 'west' as viewed in FIG. 1) central office site 10, having a (5-ESS) switch 11 coupled to an HDSL Terminal Unit (HTU)-Central Office (C) 12 through which digital communications with a remote site are conducted. The HTU-C 12 is coupled via a communication link (subscriber line) 14, such as an HDSL2 protocol-based link (which may contain one or more repeater units (not shown)), to an HDSL Terminal Unit (HTU)-Central Remote (R) 22 installed at a remote or relatively 'east' site 20. The HTU-R 22 serves to interface customer premises equipments with link 14.

Also coupled to the central office site 10 is a test head 16, such as that supplied from a number of commercial vendors, which provides access to a DSX signal stream as selected by the service provider. The test head 16 may be accessed via a local or remote terminal, such as the remote terminal 17, via a local area network, or other conventional access channel. The test head provides an interface for monitoring the performance of various portions of the digital link, typically successive equipment interface locations along the link, by means of an in-band embedded operations channel (EOC). The test head interface is used to controllably transmit one or more prescribed codes (such as a repeated 'DBDB'$_{HEX}$ sequence) into the EOC data stream for a prescribed injection interval, in order to initiate (loop query) diagnostic operations, such as a performance-monitoring loopback, in downstream equipment.

As pointed out above, in a conventional performance-monitoring operation, once a device of interest has been placed in loopback mode, then detection of such a code (e.g., DBDB transmitted as a repetitive sequence) by the performance monitoring software of its communications controller will cause a prescribed number of errors to be injected into the received pattern as it is looped back to the initiating source. In a conventional (pass/fail) scheme, the number of errors injected by the interrogated device will be one of two values, based upon whether prescribed parameters, such as signal quality and pulse attenuation, satisfy associated pass/fail thresholds. Thus the two error totals observed by the test head serve as indicators of the operational capability of the queried device. (In order to not interfere with normal communications, each number of injected errors is extremely low relative to the bit error rate (BER) customarily encountered on the link.)

As noted earlier, this 'pass/fail' approach to error injection-based performance monitoring is typically based upon a median set of criteria and, as such, cannot indicate the quality of the measurement. As a result, it may produce a failure indication for a device that may still be capable of providing an acceptable quality of performance for a period of time, before it becomes necessary to dispatch a technician for on-site testing and potential removal from service for upgrade or repair. Moreover, it does not take into account the fact that not all devices have the same level of maintenance/repair priority.

The present invention obviates this shortcoming by selectively controlling the number of injected errors, based upon in which of a plurality of respective ranges of loop performance parameters, the measurement data is located, so as to realize what is in effect a gray-scale type of quantification of performance measurement data. As a non-limiting example, FIG. 2 shows a Table listing nine pairs of performance thresholds respectively corresponding to signal quality (or Margin) and Pulse Attenuation, as well as the number of bit errors to be injected into the returned repetitive (DBDB) code stream in association with a respective threshold pair.

As can be seen from the tabulated example of FIG. 2, there are three threshold ranges for signal Margin: 1–5 dB or less (lowest quality); 2–6–10 dB (mid quality); and 3–11 dB or higher (highest quality). There are also three threshold ranges for Pulse Attenuation: 1–31 dB or higher (lowest quality); 2–26–30 dB (mid-quality); and 3–0–25 dB (highest quality). These ranges are grouped in pairs to produce a total of nine parameter ranges.

Figure 3:
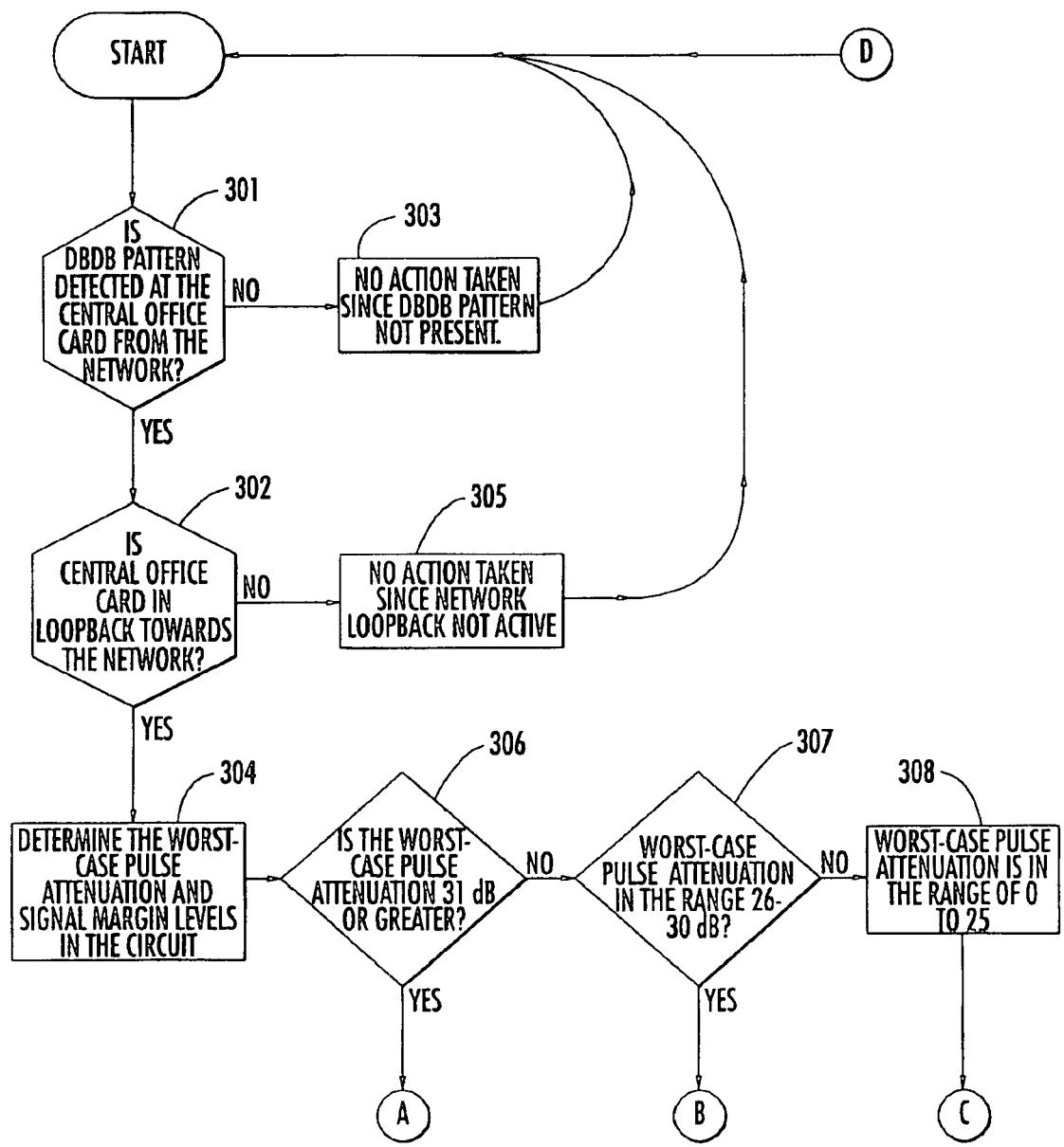
FIGS. 3–6 are respective flow charts showing steps of the loop performance reporting mechanism of the present invention.

The manner in which the present invention processes performance measurement data in accordance with these ranges to select a number of bit errors representative of the appropriate range of performance data will now be described with reference to the flow charts of FIGS. 3–6. The initial step of the routine, shown at query step 301 in FIG. 3, is to determine whether the prescribed code pattern (here the repeated pattern of 'DBDB$_{HEX}$') for triggering the bit error injection has been detected. If the answer to query step 301 is YES (indicating receipt and detection of the DBDB pattern), the routine steps to query step 302; otherwise (the answer to query step 301 is NO), as shown at state 303, no action is taken, and the routine loops back to start. Query step 302 determines whether a loopback has been established. If the answer to query step 302 is YES, the routine transitions to step 304; otherwise (the answer to query step 302 is NO), as shown at state 305, no action is taken, and the routine loops back to start.

In step 304, worst case signal margin and pulse attenuation levels are measured. As pointed out above, and as tabulated in FIG. 2, each of signal margin and pulse attenuation levels will fall within one of three ranges (for Margin: 5 dB or less, 6–10 dB, and 11 dB or higher; for Pulse Attenuation: 31 db or higher, 26–30 dB, and 0–25 dB). The signal processing routine of FIGS. 3–6 sequentially subjects the performance quality measurement data to three comparison subroutines, beginning with lowest quality pulse attenuation, and proceeding through successively higher qualities. As a result of this subroutine processing one of the multiple values of bit errors (e.g., 101–109 in the table of FIG. 2) will be selected for injection into the looped back repetitive 'DBDB' sequence. At the test initiation site, detecting and accumulating these inserted bit errors over a prescribed bit error accumulation interval (e.g., 20 seconds) will yield one of the bit error totals of the table of FIG. 2. From this accumulated value, the performance parameters of the loop are readily extracted from a look-up table copy of the table of FIG. 2, so as to provide the remote test site with a quantification of loop performance.

Figure 4:
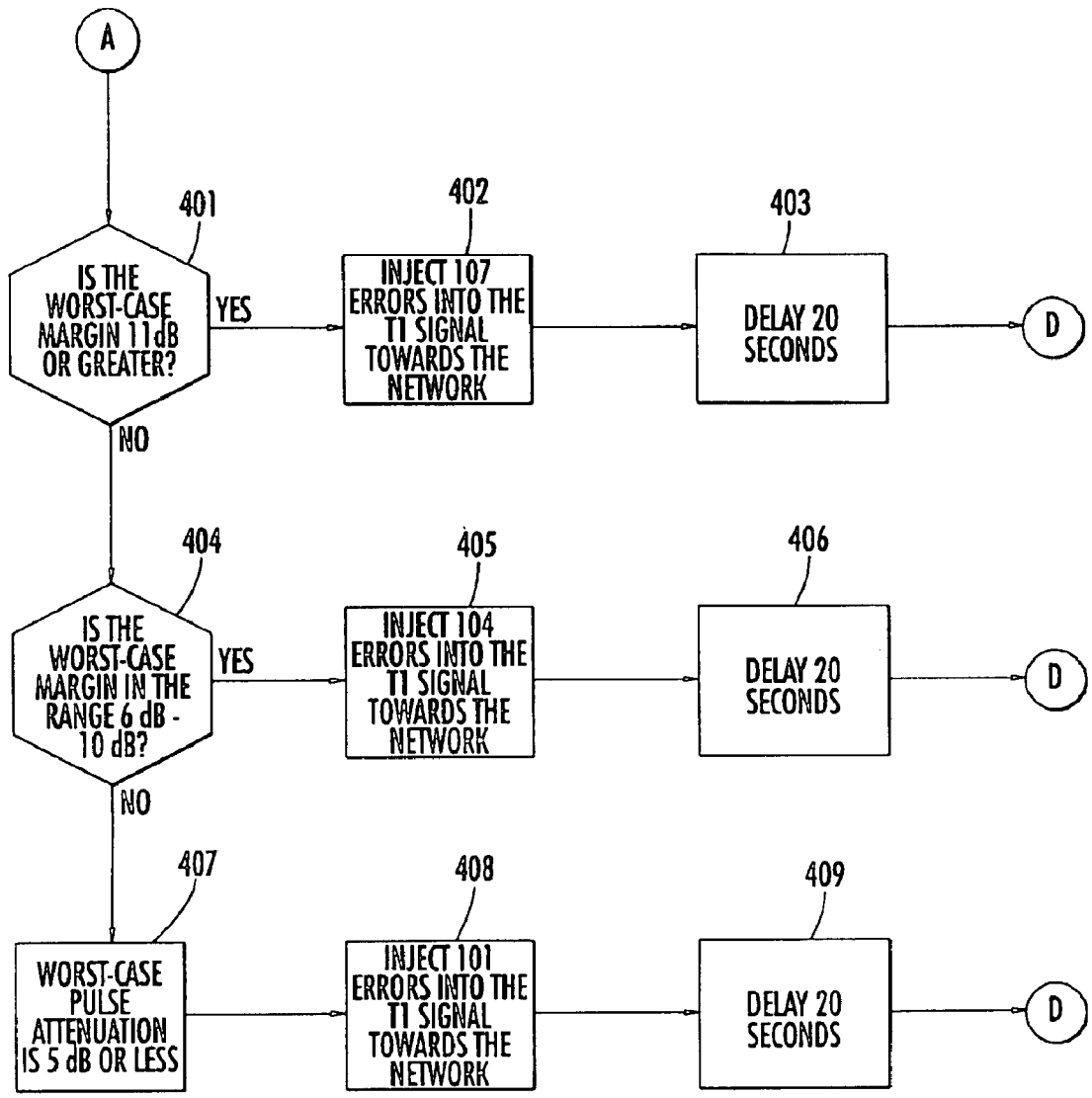
Figure 5:
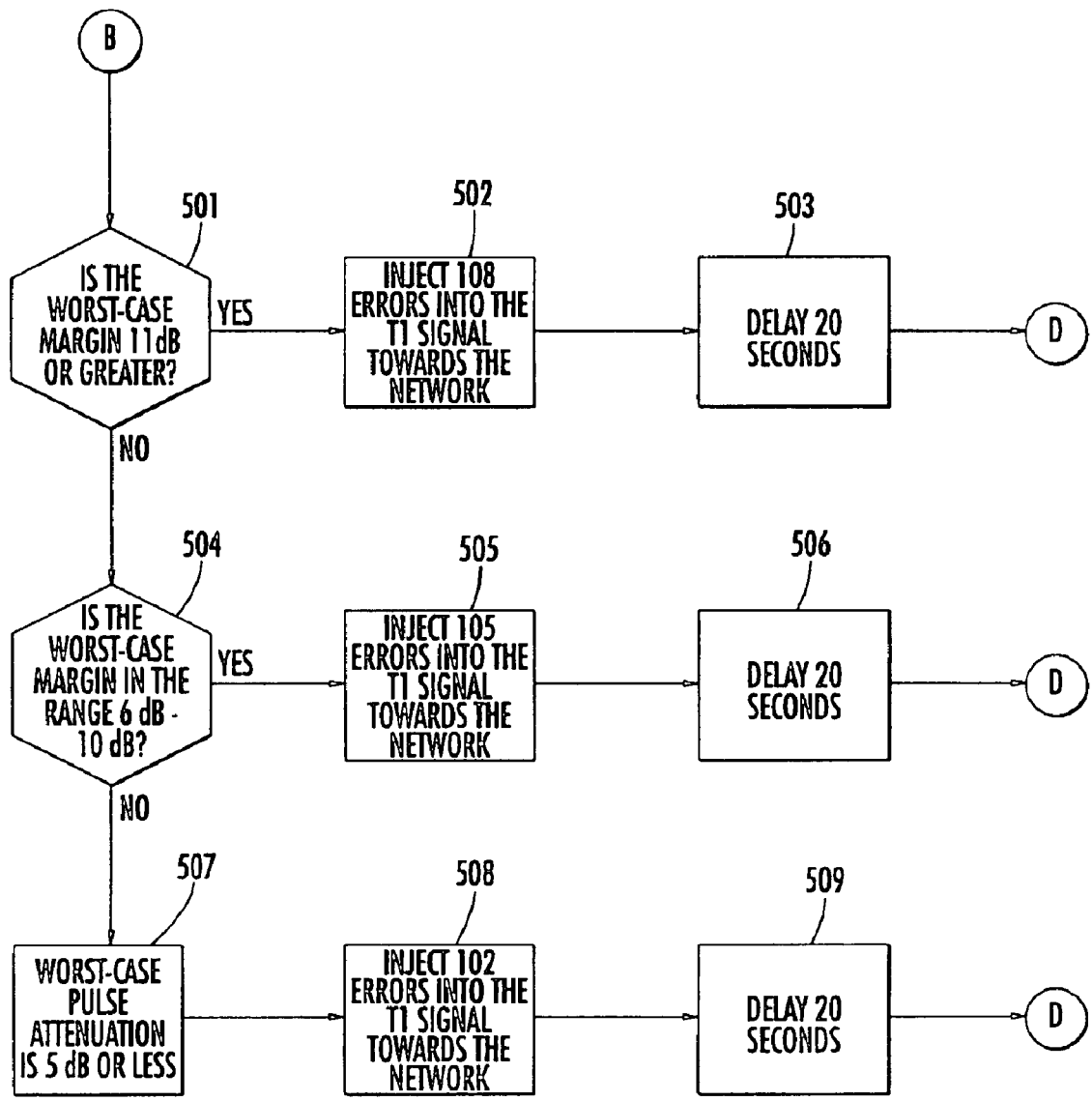
Figure 6:
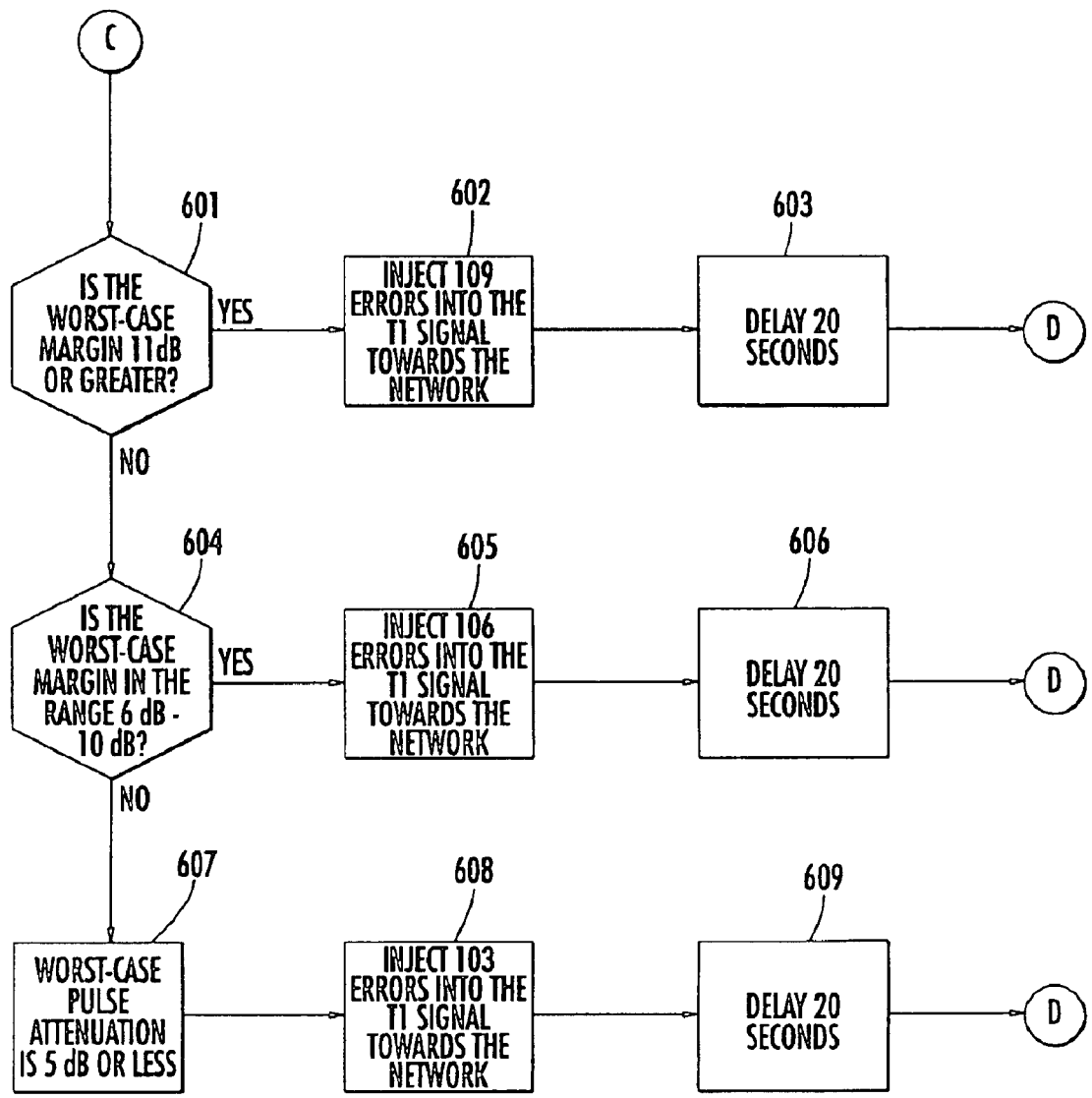

For this purpose, step 304 transitions to query step 306, which determines whether the measured worst-case value of pulse attenuation is 31 dB or greater. If the answer to query step 306 is YES, the margin subroutine of FIG. 4 is executed. Otherwise, the routine transitions to query step 307, which determines whether the measured worst-case value of pulse attenuation falls in the mid-range of 26–30 dB. If the answer to query step 307 is YES), the margin subroutine of FIG. 5 is executed. Otherwise, the routine transitions to step 308, which infers that the measured worst-case value of pulse attenuation must fall in the highest quality (lowest attenuation) range of 0–25 dB, and the signal margin subroutine of FIG. 6 is executed.

Referring now to the margin subroutine of FIG. 4, at an initial query step 401 (to which step 306 of the flow chart of FIG. 3 has branched), a determination is made whether the measured worst-case value of signal margin is 11 dB or greater. If the answer to query step 401 is YES, the sub-routine transitions to step 402, which injects a prescribed number of errors (107 from the Table of FIG. 2) associated with the measurement pair—Pulse Atten: 31 dB or higher; Margin: 11 dB or higher. It then delays for a prescribed bit error accumulation time interval (e.g. 20 seconds) in step 403 to allow for the accumulation of (injected) bit errors, and returns to start in FIG. 3.

Otherwise, if the answer to query step 401 is NO, the sub-routine transitions to the sub-routine transitions to query step 404, wherein a determination is made as to whether the measured worst-case value of signal margin is mid-range (6–10 dB). If so (the answer to query step 404 is YES), the sub-routine transitions to step 405, which injects the number of errors (104 from the Table of FIG. 2) associated with the measurement pair—Pulse Atten: 31 dB or higher; Margin: 6–10 dB. It then delays for the bit error accumulation interval in step 406 and returns to start in FIG. 3.

However, if the answer to query step 404 is NO, the sub-routine transitions to step 407, which infers that the worst-case pulse attenuation is 5 dB or less and, in step 408, injects the number of errors (101 from the Table of FIG. 2) associated with the measurement pair—Pulse Atten: 31 dB or higher; Margin: 0–5 dB. It then delays for the bit error accumulation interval in step 409 and returns to start in FIG. 3.

In the signal margin subroutine of FIG. 5, at an initial query step 501 (to which step 307 of the flow chart of FIG. 3 has branched), a determination is made whether the measured worst-case value of signal margin is 11 dB or greater. If the answer to query step 501 is YES, the sub-routine transitions to step 502, which injects the number of errors (108 from the Table of FIG. 2) associated with the measurement pair—Pulse Atten: 26–30 dB; Margin: 11 dB or higher. It then delays for the bit accumulation interval in step 503 and returns to start in FIG. 3.

Otherwise, the sub-routine transitions to query step 504, wherein a determination is made whether the measured worst-case value of signal margin is mid-range (6–10 dB). If so (the answer to query step 504 is YES), the sub-routine transitions to step 505, to inject the number of errors (105 from the Table of FIG. 2) associated with the measurement pair—Pulse Atten: 26–30 dB; Margin: 6–10 dB. It then delays for the bit accumulation interval in step 506 and returns to start in FIG. 3.

If the answer to query step 504 is NO, the sub-routine transitions to step 507, which infers that the worst-case pulse attenuation is 5 dB or less. Then, in step 508, the routine selects the number of injected errors (102 from the Table of FIG. 2) associated with the measurement pair—Pulse Atten: 26–30 dB; Margin: 0–5 dB. It then delays for the bit error accumulation interval in step 509 and returns to start in FIG. 3.

In the signal margin subroutine of FIG. 6, at query step 601 (to which step 308 of the flow chart of FIG. 3 has branched), a determination is made whether the measured worst-case value of signal margin is 11 dB or greater. If so (the answer to query step 601 is YES), and the sub-routine transitions to step 602, which selects the number of injected errors (109 from the Table of FIG. 2) associated with the measurement pair—Pulse Atten: 0–25 dB; Margin: 11 dB or higher. It then delays for the bit accumulation interval in step 603 and returns to start in FIG. 3.

Otherwise, the sub-routine transitions to query step 604, wherein a determination is made whether the measured worst-case value of signal margin is mid-range (6–10 dB). If the answer to query step 604 is YES, the sub-routine transitions to step 605, which selects the number of injected errors (106 from the Table of FIG. 2) as being that associated with the measurement pair—Pulse Atten: 0–25 dB; Margin: 6–10 dB. Step 606 then delays for the bit error accumulation interval and returns to start in FIG. 3.

If the answer to query step 604 is NO, the sub-routine transitions to step 607, which infers that the worst-case pulse attenuation is 5 dB or less and, in step 608, injects the number of errors (103 from the Table of FIG. 2) associated with the measurement pair—Pulse Atten: 0–25 dB; Margin: 0–5 dB. It then delays for the bit error accumulation interval in step 609 and returns to start in FIG. 3.

As will be appreciated from the foregoing description, the desire to provide a gray scale-type and thereby more accurate quantification of the performance capability of a remotely interrogated piece of equipment is successfully accomplished by the in-band communication scheme of the invention, in which the number of errors deliberately injected into the looped back repetitive code stream is selectable from among a plurality of different quantification values, based upon in which of a plurality of respective ranges the measured parameter values are located.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A method for reporting information representative of performance measurement data for a communication link, from a remote site at which link performance measurements are performed, to a query site comprising the steps of:
   (a) in response to said remote site detecting a prescribed digital code sequence transmitted to said remote site from said query site, causing said remote site to select one of at least three different numbers of errors, associated with respectively different ranges of link performance parameters, in accordance with a prescribed relationship between said performance measurement data and said respectively different ranges of link performance parameters; and
   (b) at said remote site, deliberately modifying said prescribed digital code sequence as received by said remote site, by introducing said selected number of errors into said prescribed digital code sequence as transported over said link from said remote site to said query site.

2. The method according to claim 1, wherein step (a) comprises causing said remote site to select that one of said at least three different numbers of errors, based upon in which of a plurality of respectively different ranges of link performance parameters, said link performance measurements parameter values are located.

3. The method according to claim 1, wherein said respectively different ranges of link performance parameters include multiple sets of performance thresholds respectively associated with plural link parameters.

4. The method according to claim 3, wherein said plural link parameters include signal margin and pulse attenuation.

5. The method according to claim 1, wherein said prescribed digital code sequence comprises a repetition of the digital code pattern $DBDB_{HEX}$.

6. The method according to claim 1, wherein step (b) comprises introducing said selected number of errors into said prescribed digital code sequence transported over said link from said remote site to said query site as a DSX digital signal stream.

7. A method for enabling a communication link test site, remote with respect to a measurement site, to derive information representative of performance measurement data performed on said communication link by said measurement site, said method comprising the steps of:
   (a) transmitting, from said test site over said communication link to said measurement site, a prescribed digital code sequence;
   (b) at said measurement site, deliberately modifying said prescribed digital code sequence as received by said measurement site, by introducing a selected one of at least three different numbers of errors, associated with respectively different ranges of link performance parameters, into said prescribed digital code sequence as looped back over said communication link to said test site, in accordance with a prescribed relationship between said performance measurement data and said respectively different ranges of link performance parameters; and
   (c) at said test site, processing said prescribed digital code sequence into which said selected number of errors have been introduced in step (b), as looped back over said communication link, so as to derive said information representative of said performance measurement data performed on said communication link by said measurement site.

8. The method according to claim 7, wherein step (b) comprises introducing that one of said at least three different numbers of errors into said prescribed digital code sequence as looped back over said communication link to said test site, based upon in which of a plurality of respectively different ranges of link performance parameters, said link performance measurements parameter values are located.

9. The method according to claim 8, wherein said respectively different ranges of link performance parameters include multiple sets of performance thresholds respectively associated with plural link parameters.

10. The method according to claim 9, wherein said plural link parameters include signal margin and pulse attenuation.

11. The method according to claim 9, wherein said prescribed digital code sequence comprises a repetition of the digital code pattern $DBDB_{HEX}$.

12. The method according to claim 7, wherein step (b) comprises introducing said selected number of errors into said prescribed digital code sequence transported over said link from said measurement site to said test site as a DSX digital signal stream.

* * * * *